(12) United States Patent
Naruse

(10) Patent No.: US 9,435,823 B2
(45) Date of Patent: *Sep. 6, 2016

(54) PHYSICAL QUANTITY SENSOR, ELECTRONIC DEVICE, AND MOVING OBJECT

(71) Applicant: Seiko Epson Corporation, Tokyo (JP)

(72) Inventor: Atsuki Naruse, Shiojiri (JP)

(73) Assignee: Seiko Epson Corporation (JP)

( * ) Notice: Subject to any disclaimer, the term of this patent is extended or adjusted under 35 U.S.C. 154(b) by 273 days.

This patent is subject to a terminal disclaimer.

(21) Appl. No.: 14/152,179

(22) Filed: Jan. 10, 2014

(65) Prior Publication Data

US 2014/0196542 A1    Jul. 17, 2014

(30) Foreign Application Priority Data

Jan. 11, 2013  (JP) ................................. 2013-003251

(51) Int. Cl.
G01P 15/125 (2006.01)
G01P 15/08 (2006.01)

(52) U.S. Cl.
CPC ......... *G01P 15/125* (2013.01); *G01P 15/0802* (2013.01); *G01P 2015/0814* (2013.01)

(58) Field of Classification Search
CPC .. G01P 15/125; G01P 15/0802; G01P 15/08; G01P 15/18; B81B 3/0008; B81B 3/0078; B81B 3/0051
USPC .............. 73/514.32, 514.36, 514.38, 504.14, 73/504.12

See application file for complete search history.

(56) References Cited

U.S. PATENT DOCUMENTS

| | | | |
|---|---|---|---|
| 5,542,295 A * | 8/1996 | Howe ................... | B81B 3/0008 361/283.2 |
| 6,065,341 A | 5/2000 | Ishio et al. | |
| 6,105,428 A * | 8/2000 | Schmiesing ........ | G01P 15/0802 361/283.3 |
| 6,272,926 B1 * | 8/2001 | Fehrenbach .......... | B81B 3/0051 73/514.32 |
| 6,360,605 B1 * | 3/2002 | Pinter ................... | B81B 3/0008 73/514.32 |
| 6,494,096 B2 | 12/2002 | Sakai et al. | |
| 6,923,062 B2 * | 8/2005 | Franz .................... | B81B 3/0051 73/514.01 |
| 7,000,473 B2 * | 2/2006 | Vandemeer ............. | B81B 3/001 73/514.32 |
| 2002/0104377 A1 * | 8/2002 | Ishio ...................... | B81B 3/0008 73/504.14 |
| 2002/0112538 A1 * | 8/2002 | Pinter ................... | B81B 3/0008 73/514.32 |
| 2004/0187592 A1 * | 9/2004 | Sugiura .............. | G01C 19/5719 73/780 |
| 2005/0132805 A1 * | 6/2005 | Park ...................... | G01P 15/125 73/514.32 |
| 2010/0050771 A1 * | 3/2010 | Je .......................... | G01P 15/125 73/514.32 |
| 2010/0281980 A1 * | 11/2010 | Yazawa ................. | B81B 3/0078 73/514.32 |
| 2012/0111615 A1 | 5/2012 | Yoda et al. | |
| 2013/0255377 A1 | 10/2013 | Furuhata et al. | |
| 2015/0059474 A1 * | 3/2015 | Tanaka .................. | G01P 15/125 73/514.32 |

FOREIGN PATENT DOCUMENTS

| | | |
|---|---|---|
| JP | 2001-330623 A | 11/2001 |
| JP | 3660119 B2 | 6/2005 |
| JP | 2012-098208 A | 5/2012 |
| JP | 2012-163415 A | 8/2012 |
| JP | 2013-104868 A | 5/2013 |
| JP | 2013-213754 A | 10/2013 |

* cited by examiner

*Primary Examiner* — Helen Kwok

(74) *Attorney, Agent, or Firm* — Harness, Dickey & Pierce, P.L.C.

(57) ABSTRACT

A physical quantity sensor includes: an element piece including a movable weight and movable electrode portions which are provided to extend from the movable weight; fixed electrode portions which are provided in a first direction in which the element piece is displaced, with a gap d1 interposed therebetween; and fixed portions which are provided to face an end portion of the element piece, in which a recess is provided on the end portion of the movable weight in a position facing the fixed portions, a first stopper portion which extends towards the movable weight is provided on the fixed portion, and a tip end of the first stopper portion is inserted into the recess, and a gap d2 between the tip end and the movable weight is narrower than the gap d1.

13 Claims, 9 Drawing Sheets

PHYSICAL QUANTITY SENSOR, ELECTRONIC DEVICE, AND MOVING OBJECT

BACKGROUND

1. Technical Field

The present invention relates to a physical quantity sensor, an electronic device, and a moving object.

2. Related Art

In the related art, there is a known physical quantity sensor having a structure of including a fixed electrode, and a movable electrode which is provided to be parallel with respect to the fixed electrode with a gap interposed therebetween and is provided on a movable weight that can be displaced in a given direction as a physical quantity sensor for detecting physical quantity, such as acceleration or angular velocity.

The gap between the fixed electrode and the movable electrode which is provided on the movable weight changes based on the displacement of the movable weight, and such physical quantity sensor detects a change in electrostatic capacitance generated between the fixed electrode and the movable electrode based on the change in the gap thereof, and accordingly detects a change in physical quantity such as acceleration or angular velocity.

For example, Japanese Patent No. 3660119 discloses a physical quantity sensor having a structure of providing a stopper portion which regulates displacement of the movable weight on an inner side of a beam portion which is folded to configure a polygon to support the movable weight, and preventing attachment of the movable electrode to the fixed electrode or preventing any potential damage thereon.

However, since the stopper portion is provided on the inner side of the beam portion which is folded to configure a polygon, the beam portion is set to be large, and therefore there is a concern that it is not easy to miniaturize the size of the physical quantity sensor.

SUMMARY

An advantage of some aspects of the invention is to solve at least a part of the problems described above, and the invention can be implemented as the following forms or application examples.

APPLICATION EXAMPLE 1

This application example is directed to a physical quantity sensor including: an element piece including a movable weight and movable electrode portions which are provided to extend from the movable weight; fixed electrode portions which are provided in a first direction in which the element piece is displaced, with a gap d1 interposed therebetween; and fixed portions which are provided to face an end portion of the element piece, in which a recess is provided on the end portion of the movable weight in a position facing the fixed portions, a first stopper portion which extends towards the movable weight is provided on the fixed portion, and a tip end of the first stopper portion is inserted into the recess, and a gap d2 between the tip end and the movable weight is narrower than the gap d1.

According to the physical quantity sensor, the element piece and the fixed electrode portions with the gap d1 interposed between the element piece and the fixed electrode portions are provided, and the tip end of the first stopper portion is inserted (loosely inserted) into the recess which is provided on the movable weight, with the gap d2 which is narrower than the gap d1. Accordingly, in a case where the movable weight is displaced, the first stopper portion and the recess which is provided on the movable weight come in contact with each other, before the contact between the fixed electrode portions and the element piece portion, and thus it is possible to suppress the contact between the fixed electrode portions and the movable electrode portions. In addition, since the first stopper portion is loosely inserted into the recess which is provided on the movable weight, it is possible to provide the first stopper portion without changing the size of the physical quantity sensor.

Thus, when the element piece is excessively displaced, it is possible to obtain a physical quantity sensor which can decrease the damage from the contact (collision) between the fixed electrodes and the element piece, and realize miniaturization.

APPLICATION EXAMPLE 2

In the physical quantity sensor according to the application example described above, it is preferable that a first protrusion which is provided to protrude in a second direction is included in the recess.

According to the physical quantity sensor of this configuration, the first protrusion which protrudes to face the first stopper portion in a second direction which intersects with an extending direction of the first stopper portion, is provided on an inner surface of the recess into which the first stopper portion is loosely inserted. Accordingly, in a case where the movable weight is displaced in the second direction, the first stopper portion and the first protrusion come in contact with each other, and therefore, it is possible to make a contacting area of the first stopper portion and the movable weight small, and possible to alleviate the impact from the contact, compared to a case of direct contact between the first stopper portion and the recess.

Thus, even when the movable weight is excessively displaced in the second direction, it is possible to prevent damage from the contact (collision) between the fixed electrode portions and the movable electrode portions.

APPLICATION EXAMPLE 3

In the physical quantity sensor according to the application example described above, it is preferable that a second stopper portion which is provided to extend in the second direction is provided on the first stopper portion.

According to the physical quantity sensor of this configuration, the second stopper portion which is provided to extend in the second direction is provided on the first stopper portion which is loosely inserted into the recess.

Accordingly, in a case where the movable weight is displaced in the second direction, the recess which is provided on the movable weight and the second stopper portion come in contact with each other, and therefore, it is possible to make a contacting area of the first stopper portion and the second stopper portion, and the movable weight small, and possible to alleviate the impact from the contact, compared to a case of direct contact between the first stopper portion and the recess.

Thus, even when the movable weight is excessively displaced in the second direction, it is possible to prevent damage from the contact (collision) between the fixed electrode portions and the movable electrode portions.

APPLICATION EXAMPLE 4

In the physical quantity sensor according to the application example described above, it is preferable that a second protrusion which is provided to extend in the first direction is provided on the second stopper portion.

According to the physical quantity sensor of this configuration, the second protrusion is provided on the second stopper portion, in the first direction, which intersects with the first stopper portion which is loosely inserted into the recess.

Accordingly, in a case where the movable weight is displaced in the first direction, the second protrusion which is provided on the second stopper portion and the movable weight come in contact with each other. Therefore, it is possible to make a contacting area of the first stopper portion and the second stopper portion, and the movable weight small. In addition, in a case where the movable weight is displaced in the first direction, it is possible to alleviate the impact from the contact, compared to a case of direct contact between the second stopper portion and the recess.

Thus, even when the movable weight is excessively displaced in the first direction, it is possible to prevent damage from the contact (collision) between the fixed electrode portions and the movable electrode portions, and possible to prevent damage on the first stopper portion and the second stopper portion.

APPLICATION EXAMPLE 5

In the physical quantity sensor according to the application example described above, it is preferable that a third protrusion is provided on the movable weight in a position facing the second stopper portion.

According to the physical quantity sensor of this configuration, the third protrusion which protrudes to face the second stopper portion on the recess to which the second stopper portion is loosely inserted, is provided on the movable weight.

Accordingly, in a case where the movable weight is displaced in the first direction, the third protrusion which is provided on the movable weight and the second stopper portion come in contact with each other, and therefore, it is possible to make a contacting area of the first stopper portion and the second stopper portion, and the movable weight small. In addition, in a case where the movable weight is displaced in the first direction, it is possible to alleviate the impact from the contact, compared to a case of direct contact between the second stopper portion and the recess.

Thus, even when the movable weight is excessively displaced in the first direction, it is possible to suppress damage from the contact (collision) between the fixed electrode portions and the movable electrode portions, and possible to prevent damage on the first stopper portion and the second stopper portion.

APPLICATION EXAMPLE 6

This application example is directed to an electronic device on which the physical quantity sensor described above is loaded.

According to the electronic device, by loading the physical quantity sensor described above, even when the impact is applied to the electronic device, it is possible to suppress the damage on the physical quantity sensor and subsequently detect the physical quantity, and therefore it is possible to obtain an electronic device having high reliability.

APPLICATION EXAMPLE 7

This application example is directed to a moving object on which the physical quantity sensor described above is loaded.

According to the moving object, by loading the physical quantity sensor described above, it is possible to suppress the damage on the physical quantity sensor from the impact from the moving object and subsequently detect the physical quantity, and therefore it is possible to obtain a moving object having high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
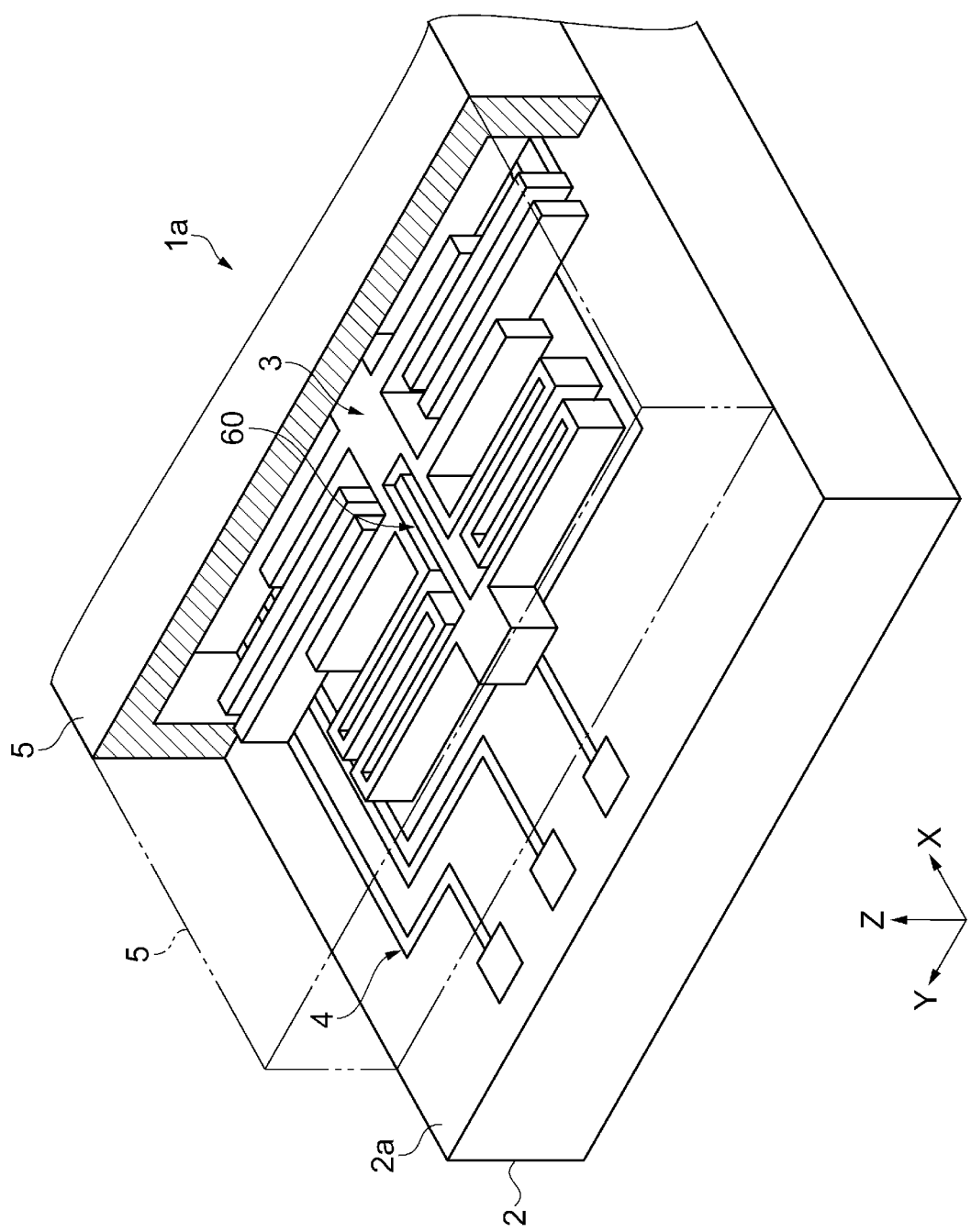
FIG. 1 is a perspective view schematically showing a physical quantity sensor according to First Embodiment.

Hereinafter, embodiments of the invention will be described with reference to the drawings. In each drawing showing hereinafter, to make the each constituent element recognizable on the drawing, a dimension or a ratio of each constituent element may be different from the actual constituent elements.

First Embodiment

A physical quantity sensor according to First Embodiment will be described with reference to FIGS. 1 to 4.

Figure 2:
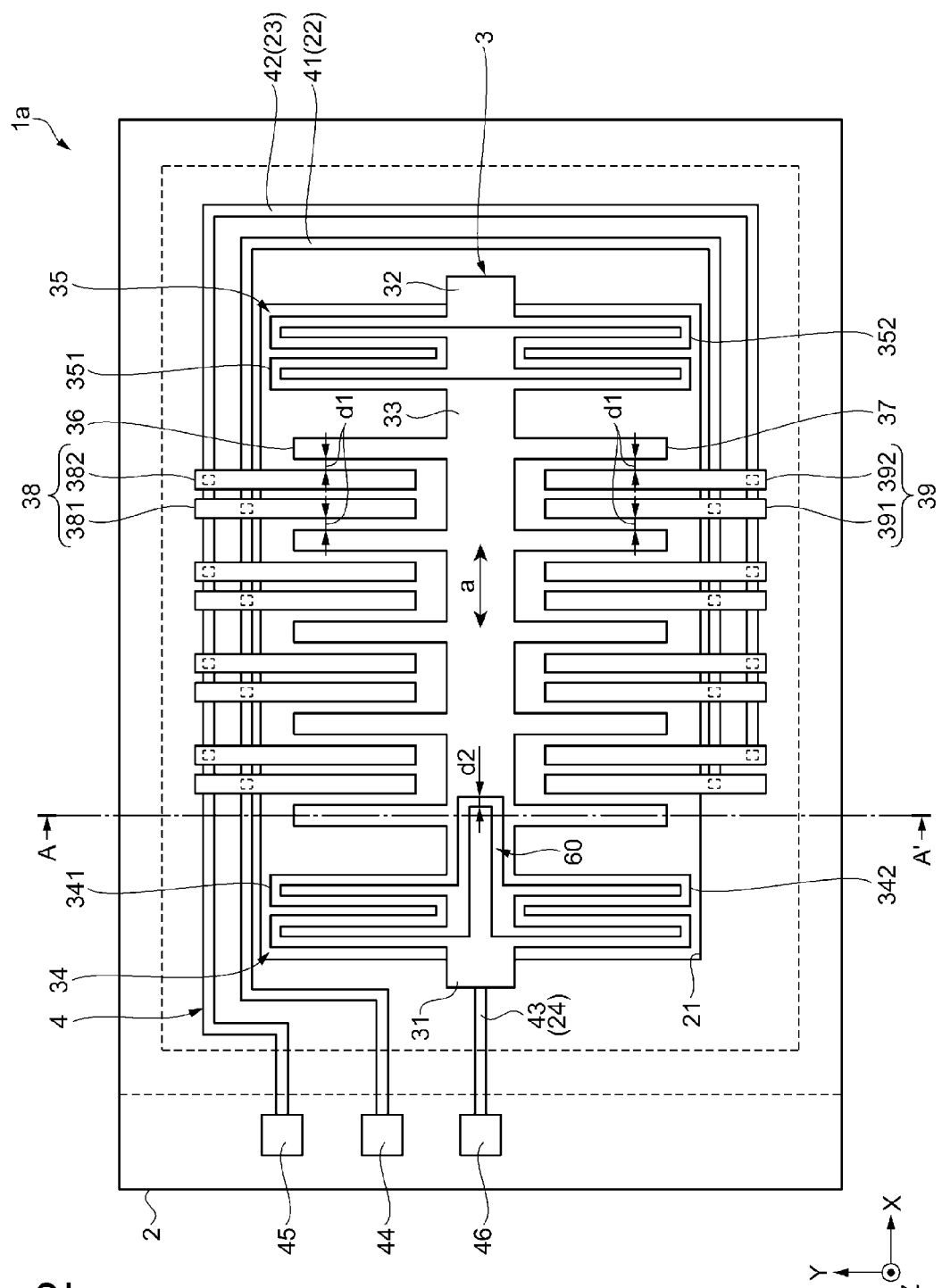
FIG. 2 is a plan view schematically showing a physical quantity sensor according to First Embodiment.
Figure 3:
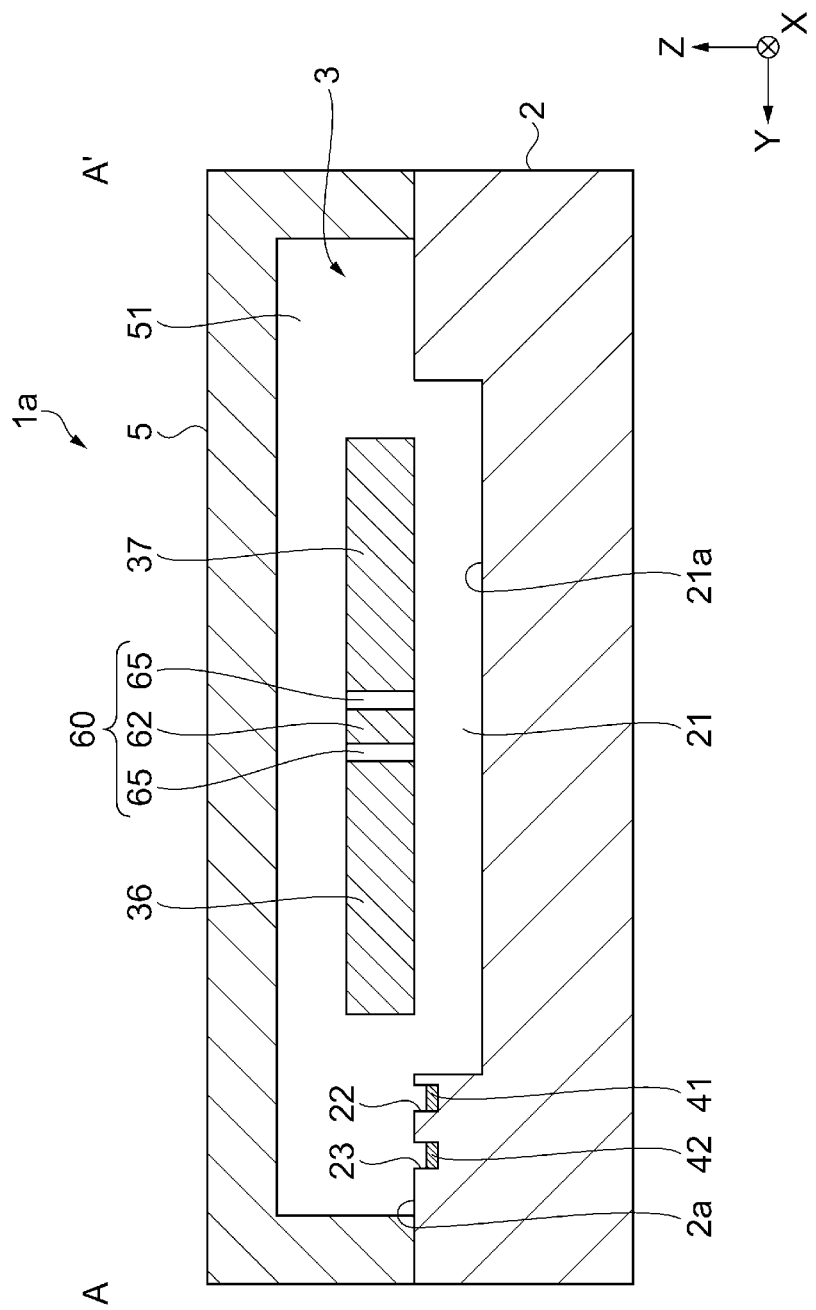
FIG. 3 is a cross-sectional view schematically showing a physical quantity sensor according to First Embodiment.
Figure 4:
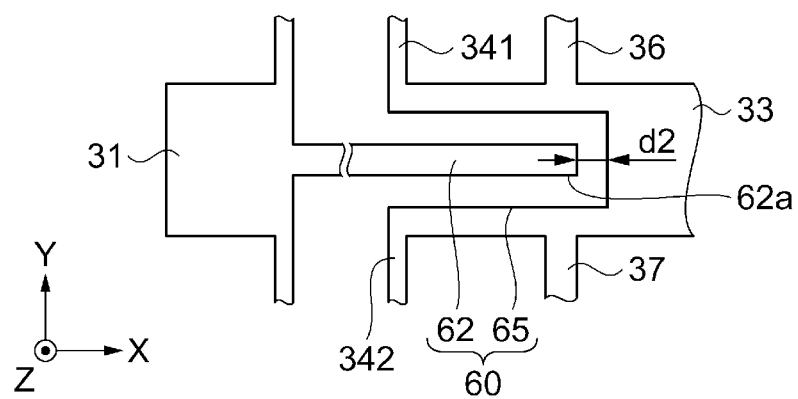
FIG. 4 is a partially enlarged view showing a part of a physical quantity sensor according to First Embodiment.

FIG. 1 is a perspective view schematically showing the physical quantity sensor according to First Embodiment. FIG. 2 is a plan view schematically showing the physical quantity sensor shown in FIG. 1. FIG. 3 is a cross-sectional view of the physical quantity sensor schematically showing a cross section taken along with line III-III of FIG. 2. FIG. 4 is a partially enlarged view of a part of a stopper portion shown in FIGS. 1 and 2. For convenience of description, a cover is omitted in FIG. 2. In addition, in FIGS. 1 to 4, an X axis, a Y axis, and Z axis are shown as three axes which are orthogonal with respect to each other, and the Z axis is an axis showing a thickness direction in which a substrate and the cover are superimposed on each other.

Structure of Physical Quantity Sensor

A physical quantity sensor 1a shown in FIG. 1 includes a substrate 2, an element piece 3 which is connected to (bonded to) and supported by the substrate 2, and a conductor pattern 4 which is electrically connected to the element piece 3. Hereinafter, each portion configuring the physical quantity sensor 1a will be subsequently described in detail.

Substrate.

The substrate 2 is provided to support the element piece 3. The substrate 2 has a plate shape, and is provided with a cavity portion 21 on a first surface 2a which is a main surface thereof. In a plan view when the substrate 2 is seen from the first surface 2a side, the cavity portion 21 is provided so as to include a movable weight 33, movable electrode portions 36 and 37, and beam portions 34 and 35 configuring the element piece 3 which will be described later. In addition, the cavity portion 21 includes an inner bottom 21a. Such a cavity portion 21 configures a space, that is, a clearance portion which suppresses contact of the movable weight 33, the movable electrode portions 36 and 37, and the beam portions and 35 of the element piece 3 with the substrate 2. Accordingly, the movable weight 33 of the element piece 3 can be displaced.

This space may be provided as an opening portion which penetrates the substrate 2 in the thickness direction (Z axis direction), instead of the cavity portion 21 (recess). In addition, in the embodiment, a shape of the cavity portion 21 in a plan view seen from the first surface 2a side is a rectangular shape, however it is not limited thereto.

On the first surface 2a of the substrate 2, wiring groove portions 22, 23, and 24 are provided on an outer side of the cavity portion 21 described above. In a plan view seen from the first surface 2a side, the wiring groove portions 22, 23, and 24 have a shape corresponding to the conductor pattern 4.

It is preferable to use a material such as silicon or glass, for example, as a material configuring such a substrate 2. In addition, in a case where the element piece 3 is configured with a silicon material as a main material, it is more preferable to use borosilicate glass for the substrate 2.

It is preferable that a difference in a coefficient of linear expansion between the configuring material of the substrate 2 and the configuring material of the element piece be small as much as possible. For example, by using borosilicate glass for the substrate 2 and silicon for the element piece 3, a difference in a coefficient of linear expansion between the substrate 2 and the element piece 3 becomes small and strain from thermal expansion can be suppressed.

Element Piece

The element piece 3 is configured with fixed portions 31 and 32, the movable weight 33, the beam portions 34 and 35, the movable electrode portions 36 and 37, and the fixed electrode portions 38 and 39.

In such an element piece 3, the movable weight 33 and the movable electrode portions 36 and 37 are displaced in a direction of an arrow a shown in FIG. 2, that is, the X axis direction (positive X axis direction or negative X axis direction), for example, based on a change in physical quantity such as acceleration or angular velocity, while causing elastic deformation of the beam portions 34 and 35. According to such displacement, a gap between the movable electrode portion 36 and the fixed electrode portion 38, and a gap between the movable electrode portion 37 and the fixed electrode portion are displaced, respectively. That is, based on such displacement, electrostatic capacitance between the movable electrode portion 36 and the fixed electrode portion 38, and electrostatic capacitance between the movable electrode portion 37 and the fixed electrode portion 39 are changed in size, respectively.

Thus, the physical quantity such as acceleration or angular velocity can be detected based on the electrostatic capacitance.

The fixed portions 31 and 32, the movable weight 33, the beam portions 34 and 35, and the movable electrode portions 36 and 37 are provided to be integrally formed. Each of the fixed portions 31 and 32 is connected to the first surface 2a of the substrate 2 described above. In detail, the fixed portion 31 is connected to a part of a negative X axis direction side, with respect to the cavity portion 21 of the first surface 2a of the substrate 2. The fixed portion 32 is connected to a part of a positive X axis direction side, with respect to the cavity portion 21 of the first surface 2a of the substrate 2. In addition, in a plan view seen from the first surface 2a side, the fixed portions 31 and 32 are provided to across an outer periphery edge of the cavity portion 21, respectively.

A stopper portion 60 which regulates the displacement of the movable weight 33 is provided on the physical quantity sensor 1a of the embodiment.

In the stopper portion 60, a first stopper portion 62 which extends from the fixed portion 31 towards a first direction which is the X axis direction (positive X axis direction) shown by an arrow a (see FIG. 2) showing a direction of the displacement of the movable weight 33, and a recess 65 which has an opening facing the fixed portion 31 on one end of the movable weight 33 are provided. The stopper portion 60 will be described later.

Positions and shapes of the fixed portions 31 and 32 are determined from positions and shapes of the beam portions 34 and 35 or the conductor pattern 4, and they are not limited thereto.

Movable Weight

The movable weight 33 is provided between two fixed portions 31 and 32. In the embodiment, the movable weight 33 has a longitudinal shape which extends in the X axis direction. The shape of the movable weight 33 is determined from the shape or the size of each portion configuring the element piece 3, and it is not limited thereto.

Such a movable weight 33 is connected with respect to the fixed portion 31 through the beam portion 34, and is connected with respect to the fixed portion 32 through the beam portion 35. More specifically, an end portion of the movable weight 33 on the negative X axis direction side is connected to the fixed portion 31 through the beam portion 34, and an end portion of the movable weight 33 on the positive X axis direction side is connected to the fixed portion 32 through the beam portion 35.

The beam portions 34 and 35 are connected with respect to the fixed portions 31 and 32 so that the movable weight 33 can be moved.

The beam portion 34 is configured with a plurality of beams 341 and 342. Each of the beams 341 and 342 has a shape which extends in the X axis direction while meandering in the Y axis direction.

In the same manner, the beam portion 35 is configured with a plurality of beams 351 and 352 having a shape which extends in the X axis direction while meandering in the Y axis direction.

In the embodiment, the beam portions 34 and 35 are configured so that the movable weight 33 can be displaced (moved) mainly in the positive X axis direction and the negative X axis direction shown by the arrow a in FIG. 2.

Movable Electrode Portion

The movable electrode portion 36 is provided on a positive Y axis direction side which is a width direction of the movable weight 33 supported so as to be displaced in the X axis direction with respect to the substrate 2, and the movable electrode portion 37 is provided on a negative Y axis direction which is the opposite side thereof. The movable electrode portion 36 protrudes from the movable weight 33 in the positive Y axis direction and the plurality thereof are provided in parallel with each other so as to have a comb-teeth shape. In the same manner, the movable electrode portion 37 protrudes from the movable weight 33 in the negative Y axis direction and the plurality thereof are provided in parallel with each other so as to have a comb-teeth shape.

As described above, the plurality of movable electrode portions 36 and the plurality of movable electrode portions 37 are provided respectively in parallel with each other in the X axis direction (direction of the arrow a shown in FIG. 2) in which the movable weight 33 can be moved. That is to say, the plurality of movable electrode portions 36 and 37 are provided in parallel along the X axis direction which is a direction in which the movable weight 33 is displaced, and so as to extend to both sides of the Y axis direction intersecting with a direction of the displacement.

Accordingly, the electrostatic capacitance generated between the fixed electrode portion 38 which will be described later and the movable electrode portions 36 and 37 can be changed based on the displacement of the movable weight 33.

Fixed Electrode Portion

The fixed electrode portion 38 is provided so as to have a comb-teeth shape to be engaged with respect to the movable electrode portion 36, with a gap d1 interposed therebetween. For example, fixed electrodes 381 and 382 are provided with the movable electrode portion 36 and the gap d1 interposed therebetween, respectively.

In the same manner as the fixed electrode portion 38 described above, the fixed electrode portion 39 is provided so as to have a comb-teeth shape to be engaged with respect to the movable electrode portion 37, with a gap d1 interposed therebetween. For example, fixed electrodes 391 and 392 are provided with the movable electrode portion 37 and the gap d1 interposed therebetween, respectively.

An end portion of such a fixed electrode portion 38 on a side opposite to the movable weight 33 is connected to a portion of the positive Y axis direction side with respect to the cavity portion 21 of the first surface 2a of the substrate 2. In the fixed electrode portion 38, one end on the fixed side thereof is set to a fixed end, and a free end on the opposite side thereof is provided to extend in the negative Y axis direction.

An end portion of such a fixed electrode portion 39 on a side opposite to the movable weight 33 is connected to a portion of the negative Y axis direction side with respect to the cavity portion 21 of the first surface 2a of the substrate 2. In the fixed electrode portion 39, one end on the fixed side thereof is set to a fixed end, and a free end on the opposite side thereof is provided to extend in the positive Y axis direction.

Herein, the stopper portion 60 will be described.

The stopper portion 60 which regulates the displacement of the movable weight 33 is provided in the physical quantity sensor 1a of the embodiment. The stopper portion 60 is configured with the first stopper portion 62 and the recess 65.

In the stopper portion 60, the first stopper portion 62 which extends in the first direction (positive X axis direction) from the fixed portion 31 to the movable weight 33 is provided. In addition, in the stopper portion 60, the recess 65 including an opening facing the fixed portion 31 on one end of the movable weight 33 on the negative X axis direction side is provided.

The first stopper portion 62 extends in the first direction (X axis direction) towards the recess 65 which is provided on the movable weight 33 so that the stopper portion 60 is inserted (loosely inserted) into the recess 65. In addition, the first stopper portion 62 is loosely inserted into the recess 65 with a gap d2 interposed between a tip end 62a and the movable weight 33.

The stopper portion 60 is provided for suppressing damage due to mutual contact between the movable electrode portion 36 and the fixed electrode portion 38, and the movable electrode portion 37 and the fixed electrode portion 39 which are provided to be parallel with each other, in a case where the movable weight 33 is excessively displaced. In addition, the stopper portion 60 is provided for suppressing sticking or shorting occurred due to mutual contact between the movable electrode portion 36 and the fixed electrode portion 38, and the movable electrode portion 37 and the fixed electrode portion 39.

Herein, before the fixed electrode portions 38 and 39, and the movable electrode portions 36 and 37 come in contact with each other, it is necessary that the first stopper portion 62 (tip end 62a) and the movable weight 33 come in contact with each other.

Accordingly, the first stopper portion 62 is provided so that the gap d2 between the tip end 62a and the movable weight 33 becomes narrower than the gap d1 between the movable electrode portions 36 and 37 and the fixed electrode portion 38. That is, the first stopper portion 62 is provided to extend from the fixed portion 31 so that a relationship of sizes of the gap d1 and the gap d2 satisfies that the gap d1>the gap d2.

Accordingly, in the physical quantity sensor 1a, the first stopper portion 62 and the movable weight 33 come in contact with each other before the contact between the fixed electrode portions 38 and 39 and the movable electrode portions 36 and 37 occurs, and it is possible to suppress the excessive displacement of the movable weight 33.

Conductor Pattern

The conductor pattern 4 is provided on the first surface 2a of the substrate 2 described above.

The conductor pattern 4 is configured with wires 41, 42, and 43, and electrodes 44, 45, and 46.

The wire 41 is provided on an outer side of the cavity portion 21 of the substrate 2 described above, and is formed along an outer periphery of the cavity portion 21. One end of the wire 41 is connected to the electrode 44, on the outer periphery edge (outer portion of a cover 5 on the first surface 2a of the substrate 2) of the first surface 2a of the substrate 2.

Such a wire 41 is electrically connected to the fixed electrode 381 as a first fixed electrode and to the fixed electrode 391 as a third fixed electrode, for example, among the plurality of fixed electrode portions 38 and 39.

The wire 42 is provided along an outer side of the wire 41 described above. One end of the wire 42 is connected to the electrode 45, on the outer periphery edge (outer portion of the cover 5 on the first surface 2a of the substrate 2) of the first surface 2a of the substrate 2.

Such a wire 42 is electrically connected to the fixed electrode 382 as a second fixed electrode and to the fixed electrode 392 as a fourth fixed electrode, for example, among the plurality of fixed electrode portions 38 and 39.

The wire 43 is provided to extend to the outer periphery portion (outer portion of the cover 5 on the substrate 2) on the first surface 2a of the substrate 2 from the fixed portion 31 on the substrate 2. One end of the wire 43 on a side opposite to the fixed portion 31 is connected to the electrode 46 on the first surface 2a (outer portion of the cover 5 on the substrate 2) of the substrate 2.

In addition, the wire 41 is provided in the wiring groove portion 22 (recess) which is provided on the first surface 2a of the substrate 2. The wire 42 is provided in the wiring groove portion 23 (recess) which is provided on the first surface 2a of the substrate 2. The wire 43 is provided in the wiring groove portion 24 (recess) which is provided on the first surface 2a of the substrate 2.

The material configuring such wires 41 to 43 is not particularly limited as long as it has conductivity. Examples thereof include indium tin oxide (ITO), indium zinc oxide (IZO), gold (Au), platinum (Pt), silver (Ag), copper (Cu), aluminum (Al), or alloy containing thereof, and the materials thereof can be used alone or in combination of two or more kinds.

In the same manner as the wires 41 to 43 described above, the material configuring the electrodes 44 to 46 is not particularly limited as long as it has conductivity.

With the wire 41 and the electrode 44, and the wire 43 and the electrode 46, it is possible to measure electrostatic capacitance between the first fixed electrode (the fixed electrode 381) and the movable electrode portion 36 through the wire 41, and electrostatic capacitance between the third fixed electrode (the fixed electrode 391) and the movable electrode portion 37.

In addition, with the wire 42 and the electrode 45, and the wire 43 and the electrode 46, it is possible to measure electrostatic capacitance between the second fixed electrode (the fixed electrode 382) and the movable electrode portion 36 through the wire 42, and electrostatic capacitance between the fourth fixed electrode (the fixed electrode 392) and the movable electrode portion 37.

Cover

The cover 5 is provided to protect the element piece 3 described above.

The cover 5 has a plate shape, and a cavity 51 is provided on one surface (lower surface) thereof. The cavity 51 is formed for allowing the displacement of the movable weight 33 and the movable electrode portions 36 and 37 of the element piece 3.

The portion of the lower surface of the cover 5 on an outer side with respect to the cavity 51 is connected to the first surface 2a of the substrate 2 described above.

The connecting method of the cover 5 and the substrate 2 is not particularly limited, and, for example, a connecting method using an adhesive or an anodic bonding (connecting) method can be used.

In addition, the material configuring the cover 5 is not particularly limited as long as it is a material suitable for the connecting method, and for example, a silicon material can be used for connection using an adhesive, and a glass material can be used for connection using the anodic bonding method.

According to First Embodiment described above, the following effects are obtained.

According to such a physical quantity sensor 1a, the tip end 62a of the first stopper portion 62 is loosely inserted into the recess 65 provided on the movable weight 33 with the gap d2 interposed therebetween which is narrower than the gap d1 which is provided by lining the fixed electrode portions 38 and 39 and the movable electrode portions 36 and 37.

Accordingly, in a case where the movable weight 33 is displaced in the first direction (positive X axis direction), the tip end 62a and the recess 65 come in contact with each other before the contact between the fixed electrode portions 38 and 39 and the movable electrode portions 36 and 37, and accordingly it is possible to suppress the contact between the fixed electrode portions 38 and 39 and the movable electrode portions 36 and 37. In addition, since the first stopper portion 62 is loosely inserted into the recess 65 provided on the movable weight 33, it is possible to suppress the contact between the fixed electrode portions 38 and 39 and the movable electrode portions 36 and 37 without changing the size of the physical quantity sensor 1a.

Therefore, it is possible to obtain the physical quantity sensor 1a which suppresses damage from the contact (collision) between the fixed electrode portions 38 and 39 and the movable electrode portions 36 and 37 when the movable weight is excessively displaced, and which realizes miniaturization.

Second Embodiment

Figure 5:
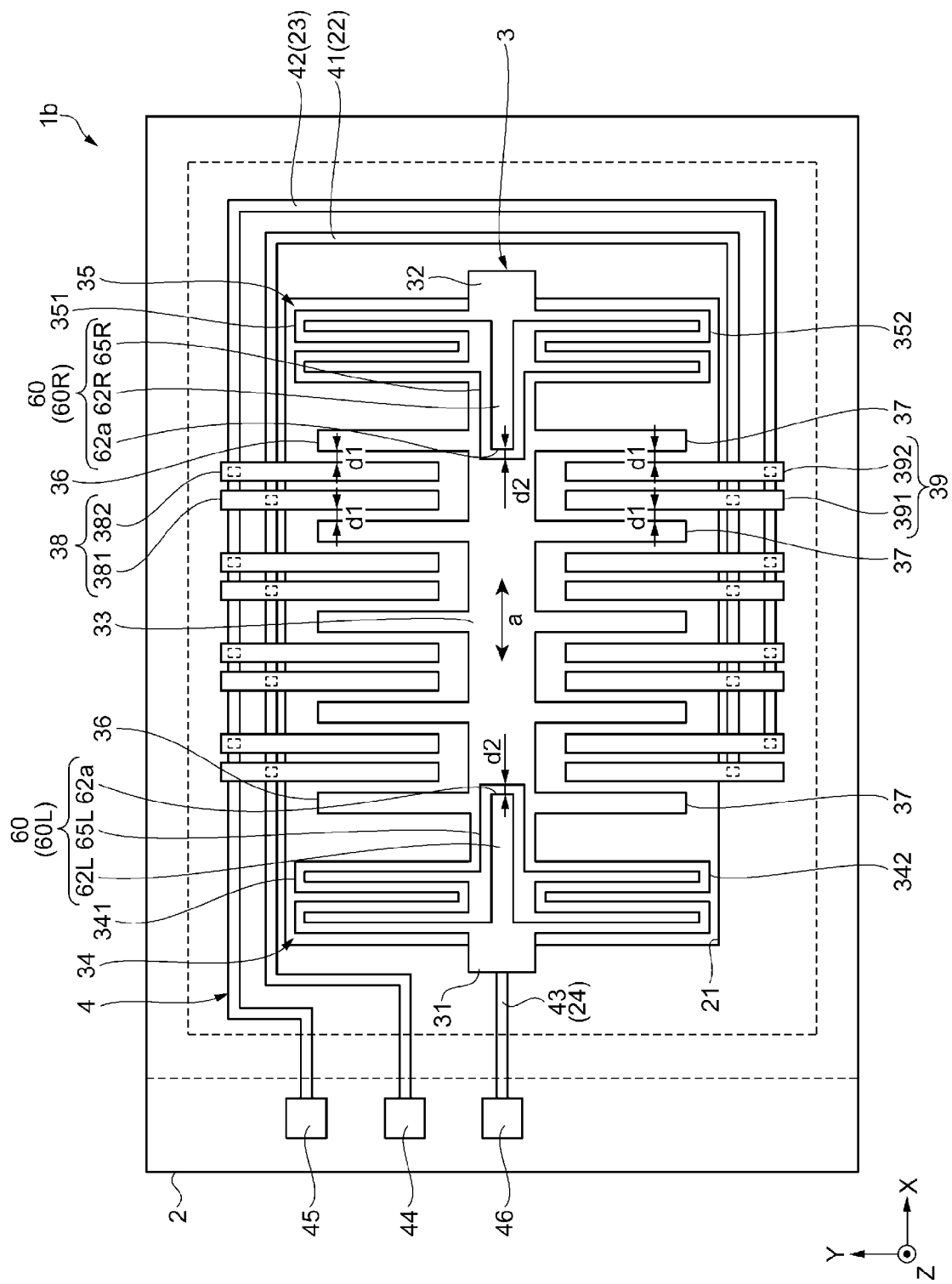
FIG. 5 is a plan view schematically showing a physical quantity sensor according to Second Embodiment.

FIG. 5 is a plan view schematically showing a physical quantity sensor according to Second Embodiment.

The cover 5 is omitted in FIG. 5. In FIG. 5, an X axis, a Y axis, and Z axis are shown as three axes which are orthogonal with respect to each other, and the Z axis is an axis showing a thickness direction in which a substrate and a cover are superimposed on each other.

A physical quantity sensor 1b according to Second Embodiment is different from the physical quantity sensor 1a described in First Embodiment, in that the plurality of stopper portions 60 are provided. Since the other configurations are the same as First Embodiment, the different parts will be described and the overlapping parts will be omitted by denoting the same reference numerals.

In the same manner as the physical quantity sensor 1a described in First Embodiment, the physical quantity sensor 1b of the embodiment includes the substrate 2, the element piece 3 which is connected to (bonded to) and supported by the substrate 2, and the conductor pattern 4 which is electrically connected to the element piece 3. The element piece 3 is configured with the fixed portions 31 and 32, the movable weight 33, the beam portions 34 and 35, the movable electrode portions 36 and 37, and the fixed electrode portions 38 and 39.

In such physical quantity sensor 1b, the movable weight 33 and the movable electrode portions 36 and 37 are displaced in a direction of an arrow a shown in FIG. 5, that is, the X axis direction (positive X axis direction or negative X axis direction), for example, based on a change in physical quantity such as acceleration or angular velocity, while causing elastic deformation of the beam portions 34 and 35.

In the physical quantity sensor 1b of the embodiment, the plurality of stopper portions 60 which regulate the displacement of the movable weight 33 are provided.

In the stopper portions 60, a stopper portion 60L is provided on one end of the movable weight 33 on the negative X axis direction side which is the displacement direction, and meanwhile a stopper portion 60R is provided on one end of the movable weight 33 on the positive X axis direction side which is the displacement direction.

The stopper portion 60L is configured with a first stopper portion 62L and a recess 65L.

In the stopper portion 60L, the first stopper portion 62L which extends in the first direction (positive X axis direction) from the fixed portion 31 to the movable weight 33 is provided. In addition, in the stopper portion 60L, the recess 65L including an opening facing the fixed portion 31 on one end of the movable weight 33 on the negative X axis direction side is provided.

The first stopper portion 62L extends in the first direction (positive X axis direction) towards the recess 65L which is provided on the movable weight 33 so that the stopper portion 60L is loosely inserted into the recess 65L. In addition, the first stopper portion 62L is loosely inserted into the recess 65L with the gap d2 interposed between the tip end 62a and the movable weight 33.

The stopper portion 60R is configured with a first stopper portion 62R and a recess 65R.

In the stopper portion 60R, the first stopper portion 62R which extends in the first direction (negative X axis direction) from the fixed portion 32 to the movable weight 33 is provided. In addition, in the stopper portion 60R, the recess 65R including an opening facing the fixed portion 32 on one end of the movable weight 33 on the positive X axis direction side is provided.

The first stopper portion 62R extends in the first direction (negative X axis direction) towards the recess 65R which is provided on the movable weight 33 so that the stopper portion 60R is loosely inserted into the recess 65R. In addition, the first stopper portion 62R is loosely inserted into the recess 65R with the gap d2 interposed between the tip end 62a and the movable weight 33.

In the same manner as First Embodiment, the stopper portions 60 are provided for suppressing damage due to the mutual contact between the movable electrode portion 36 and the fixed electrode portion 38, and the movable electrode portion 37 and the fixed electrode portion 39 which are provided to be parallel with each other and each one end thereof is a free end, in a case where the movable weight 33 is excessively displaced.

Herein, before the fixed electrode portions 38 and 39, and the movable electrode portions 36 and 37 come in contact with each other, it is necessary that the first stopper portions 62R and 62L and the movable weight 33 come in contact with each other.

Accordingly, the first stopper portions 62R and 62L are provided so that the gap d2 between the tip end 62a and the movable weight 33 becomes narrower than the gap d1 between the movable electrode portions 36 and 37 and the fixed electrode portions 38 and 39. That is, the first stopper portions 62R and 62L are provided to extend from the fixed portions 31 and 32 so that a relationship of sizes of the gap d1 and the gap d2 satisfies that the gap d1>the gap d2.

In the physical quantity sensor 1b of the embodiment, since the plurality of stopper portions 60 are provided, it is possible to regulate the displacement of the movable weight 33, even when the movable weight 33 is displaced in any direction shown in the arrow a (X axis direction) shown in FIG. 5.

For example, when the movable weight 33 is displaced in the positive X axis direction, the movable weight 33 and the stopper portion 60R come in contact with each other. That is, when the movable weight 33 is displaced in the positive X axis direction, the tip end 62a and the recess 65R of the first stopper portion 62R come in contact with each other, and it is possible to suppress the excessive displacement of the movable weight 33.

In addition, for example, when the movable weight 33 is displaced in the negative X axis direction, the movable weight 33 and the stopper portion 60L come in contact with each other. That is to say, when the movable weight 33 is displaced in the negative X axis direction, the tip end 62a and the recess 65L of the first stopper portion 62L come in contact with each other, and it is possible to suppress the excessive displacement of the movable weight 33.

Accordingly, in the physical quantity sensor 1b, the movable weight 33 and the first stopper portions 62R and 62L come in contact with each other before the contact with the fixed electrode portions 38 and 39 and the movable electrode portions 36 and 37, and it is possible to suppress the excessive displacement of the movable weight 33.

In addition, since the first stopper portions 62R and 62L are loosely inserted into the recesses 65R and 65L, even in a case where the movable weight 33 is displaced in the Y axis direction which intersects the X axis direction, the first stopper portions 62R and 62L come in contact with the recesses 65R and 65L, and it is possible to suppress the excessive displacement of the movable weight 33.

The other points are the same as those of the physical quantity sensor 1a described in First Embodiment, and thus the descriptions thereof are omitted.

According to Second Embodiment described above, the following effects are obtained.

According to such physical quantity sensor 1b, since the stopper portions 60 are provided on both ends of the movable weight 33 in the X axis direction, respectively, even in a case where the movable weight 33 is displaced in any directions of the positive X axis direction and the negative X axis direction, it is possible to suppress the contact with the fixed electrode portions 38 and 39 and the movable electrode portions 36 and 37. In addition, since the first stopper portions 62R and 62L are loosely inserted into the recesses 65R and 65L which are provided on the movable weight 33, it is possible to suppress the contact with the fixed electrode portions 38 and 39 and the movable electrode portions 36 and 37 without changing the size of the physical quantity sensor 1b.

Therefore, it is possible to obtain the physical quantity sensor 1b which suppresses the damage from the contact (collision) between the fixed electrode portions 38 and 39 and the movable electrode portions 36 and 37 when the movable weight is excessively displaced, and which realizes miniaturization.

The invention is not limited to the embodiments described above, and various modifications or improvement can be added to the embodiments. Modification examples will be described hereinafter. Herein, the overlapping parts of the same constituent elements as the embodiments described above, are omitted by denoting the same reference numerals.

MODIFICATION EXAMPLE 1

Figure 6A:
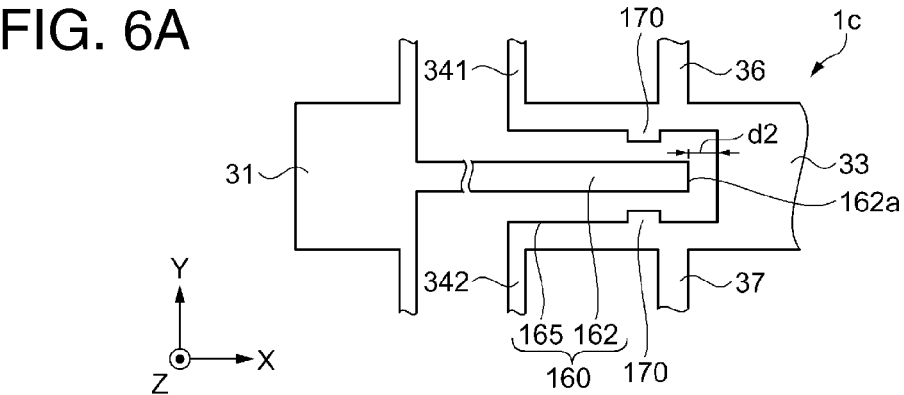
FIGS. 6A to 6D are partially enlarged views showing apart of a physical quantity sensor according to modification examples.

FIG. 6A is a partially enlarged view of a stopper portion of a physical quantity sensor according to a modification example 1.

In the same manner as the physical quantity sensors 1a and 1b described in the embodiments, in a physical quantity sensor 1c according to the modification example 1, the fixed electrode portions 38 and 39, and the movable electrode portions 36 and 37 which are provided on the movable weight 33 with the gap d1 interposed between the movable electrode portions and the fixed electrode portions 38 and 39 are provided. In addition, in the physical quantity sensor 1c according to the modification example 1, a stopper portion 160 is provided.

The physical quantity sensor 1c according to the modification example 1 has a structure of the stopper portion 160 which is different from those of the physical quantity sensors 1a and 1b described above.

In the description of the physical quantity sensor 1c according to the modification example 1, the part of the stopper portion 160 will be described, and the descriptions and drawings of the other constituent elements will be omitted.

In the stopper portion 160, a first stopper portion 162 which extends in the first direction (positive X axis direction) from the fixed portion 31, and a recess 165 which has an opening facing the fixed portion 31 on one end of the movable weight 33 are provided. In the same manner as the stopper portion 60 of the physical quantity sensor 1a described in First Embodiment, the first stopper portion 162 is loosely inserted into the recess 165 with the gap d2 interposed between a tip end 162a and the movable weight 33.

In the stopper portion 160, a protrusions 170 as a first protrusion which protrude in a second direction which intersects with the first direction in which the first stopper portion 162 extends, are provided on an inner surface of the recess 165 into which the first stopper portion 162 is loosely inserted.

Accordingly, in a case where the movable weight 33 is displaced in the Y axis direction, since the first stopper portion 162 which is loosely inserted into the recess 165 and the protrusions 170 which are provided on the recess 165 come in contact with each other, a contacting area of the stopper portion 160 is made small, and it is possible to suppress damage on the movable weight 33 and the stopper portion 160 from the impact of the contact.

In addition, in the same manner as the physical quantity sensors 1a and 1b described in the embodiments, in a case where the movable weight 33 is displaced in the X axis direction, since the recess 165 and the first stopper portion 162 (tip end 162a) which is loosely inserted into the recess 165 come in contact with each other, it is possible to suppress the contact with and the damage on the fixed electrode portions 38 and 39, and the movable electrode portions 36 and 37.

In the modification example 1, the protrusions 170 are provided so as to face each other towards the inner surface of the recess 165, however, it is not limited thereto, and the protrusions may be provided so as to face alternately towards the inner surface of the recess 165. The number of protrusions 170 is not particularly limited. A length (Y axis direction) and a width (X axis direction) of the protrusion 170 are not particularly limited, and the protrusion may be provided to have a gap between the protrusion and the first stopper portion 162.

The other configurations of the stopper portion 160 are the same as those of the physical quantity sensors 1a and 1b described in the embodiments, and thus the descriptions thereof are omitted.

MODIFICATION EXAMPLE 2

Figure 6B:
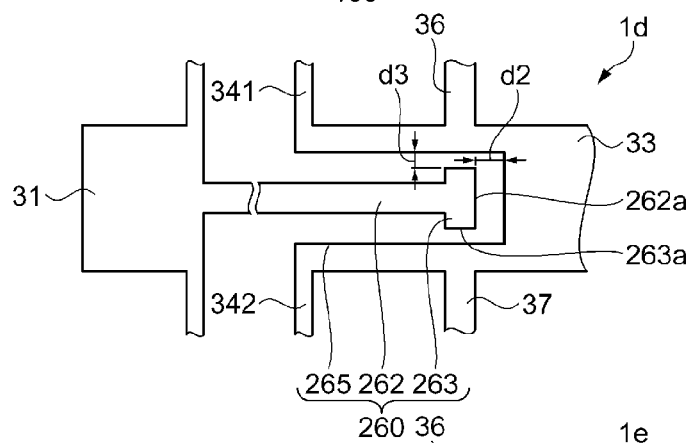

FIG. 6B is a partially enlarged view of a stopper portion of a physical quantity sensor according to a modification example 2.

In the same manner as the physical quantity sensors 1a and 1b described in the embodiments, in a physical quantity sensor 1d according to the modification example 2, the fixed electrode portions 38 and 39, and the movable electrode portions 36 and 37 which are provided on the movable weight 33 with the gap d1 interposed between the movable electrode portions and the fixed electrode portions 38 and 39 are provided. In addition, in the physical quantity sensor 1d according to the modification example 2, a stopper portion 260 is provided.

The physical quantity sensor 1d according to the modification example 2 has a structure of the stopper portion 260 which is different from those of the physical quantity sensors 1a and 1b described above.

In the description of the physical quantity sensor 1d according to the modification example 2, the part of the stopper portion 260 will be described, and the descriptions and drawings of the other constituent elements will be omitted.

In the stopper portion 260, a first stopper portion 262 which extends in the first direction (positive X axis direction) from the fixed portion 31, and a second stopper portion 263 which extends in the second direction which intersects with the first stopper portion 262 and is provided with a gap d3 interposed between the second stopper portion and the movable weight 33, are provided. In addition, in the stopper portion 260, a recess 265 which has an opening facing the fixed portion 31 on one end of the movable weight 33 is provided.

In the same manner as the stopper portion 60 of the physical quantity sensor 1a described in First Embodiment, the first stopper portion 262 is loosely inserted into the recess 265 with the gap d2 interposed between a tip end 262a and the movable weight 33.

Accordingly, in a case where the movable weight 33 is displaced in the Y axis direction, the recess 265 and an tip end 263a of the second stopper portion 263 which is loosely inserted into the recess 265 come in contact with each other. Accordingly, it is possible to make the contacting area of the recess 265 and the first stopper portion 262 small, and it is possible to suppress the damage on the movable weight 33 and the stopper portion 260 from the impact due to the contact.

In addition, in the same manner as the physical quantity sensors 1a and 1b described in the embodiments, in a case where the movable weight 33 is displaced in the X axis direction, since the recess 265 and the first stopper portion 262 (tip end 262a) which is loosely inserted into the recess 265 come in contact with each other, it is possible to suppress the contact between and the damage on the fixed electrode portions 38 and 39, and the movable electrode portions 36 and 37.

In the modification example 2, the second stopper portion 263 is provided to extend in the second direction from the tip end 262a of the first stopper portion 262. The second stopper portion 263 is not limited thereto, and may be provided to extend in the second direction from any portions of the first stopper portion 262 as long as the recess 265 is provided on a virtual line which extends from the tip end 263a of the second stopper portion 263.

Accordingly, when the movable weight 33 is displaced in the Y axis direction, it is possible to make the stopper portion 260 (the second stopper portion 263) come in contact with the recess 265.

The other configurations of the stopper portion 260 are the same as those of the physical quantity sensors 1a and 1b described in the embodiments, and thus the descriptions thereof are omitted.

MODIFICATION EXAMPLE 3

Figure 6C:
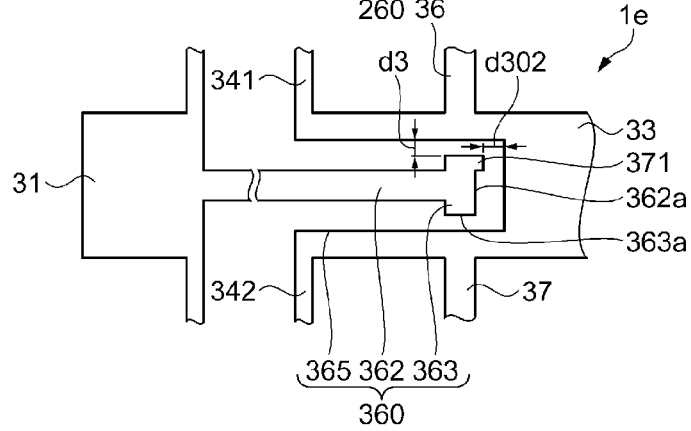

FIG. 6C is a partially enlarged view of a stopper portion of a physical quantity sensor according to a modification example 3.

In the same manner as the physical quantity sensors 1a and 1b described in the embodiments, in a physical quantity sensor 1e according to the modification example 3, the fixed electrode portions 38 and 39, and the movable electrode portions 36 and 37 which are provided on the movable weight 33 with the gap d1 interposed between the movable electrode portions and the fixed electrode portions 38 and 39 are provided. In addition, in the physical quantity sensor 1e according to the modification example 3, a stopper portion 360 is provided.

The physical quantity sensor 1e according to the modification example 3 has a structure of the stopper portion 360 which is different from those of the physical quantity sensors 1a and 1b described above.

In the description of the physical quantity sensor 1e according to the modification example 3, the part of the stopper portion 360 will be described, and the descriptions and drawings of the other constituent elements will be omitted.

In the stopper portion 360, a first stopper portion 362 which extends in the first direction (positive X axis direction) from the fixed portion 31, and a second stopper portion 363 which extends in the second direction which intersects with the first stopper portion 362 and is provided with the gap d3 interposed between the second stopper portion and the movable weight 33, are provided.

In the second stopper portion 363, a protrusion 371 as a second protrusion is provided to protrude so as to face the movable weight 33 in the first direction (positive X axis direction). In addition, in the stopper portion 360, a recess 365 which has an opening facing the fixed portion 31 on one end of the movable weight 33 is provided.

The stopper portion 360 is loosely inserted into the recess 365 with a gap d302 interposed between the protrusion 371 and the movable weight 33.

The gap d302 between the protrusion 371 and the movable weight 33 is provided to be narrower than the gap d1 between the fixed electrode portions 38 and 39 and the movable electrode portions 36 and 37 omitted in the drawing.

Accordingly, in a case where the movable weight 33 is displaced in the X axis direction, since the recess 365 and the protrusion 371 which is provided on the second stopper portion 363 come in contact with each other, it is possible to make the contacting area of the second stopper portion 363 and the recess 365 small, and it is possible to suppress the damage on the movable weight 33 and the stopper portion 360 from the impact of the contact.

In a case where the movable weight 33 is displaced in the Y axis direction, the recess 365 and the second stopper portion 363 (tip end 363a) come in contact with each other, and it is possible to suppress the excessive displacement of the movable weight 33.

One protrusion 371 is provided on the second stopper portion 363 in the modification example 3, however it is not limited thereto, and the plurality of protrusions 371 may be provided. The position of the protrusion 371 is not particularly limited as long as the protrusion 371 protrudes towards the movable weight 33.

The other configurations of the stopper portion 360 are the same as those of the physical quantity sensors 1a and 1b described in the embodiments, and thus the descriptions thereof are omitted.

MODIFICATION EXAMPLE 4

Figure 6D:
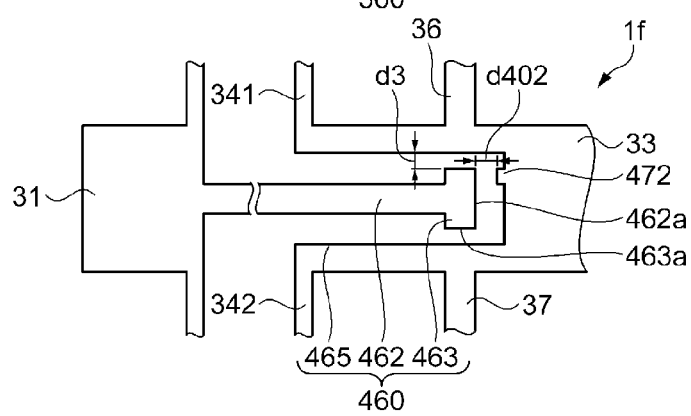

FIG. 6D is a partially enlarged view of a stopper portion of a physical quantity sensor according to a modification example 4.

In the same manner as the physical quantity sensors 1a and 1b described in the embodiments, in a physical quantity sensor 1f according to the modification example 4, the fixed electrode portions 38 and 39, and the movable electrode portions 36 and 37 which are provided on the movable weight 33 with the gap d1 interposed between the movable electrode portions and the fixed electrode portions 38 and 39 are provided. In addition, in the physical quantity sensor 1f according to the modification example 4, a stopper portion 460 is provided.

The physical quantity sensor 1f according to the modification example 4 has a structure of the stopper portion 460 which is different from those of the physical quantity sensors 1a and 1b described above. In the description of the physical quantity sensor 1f according to the modification example 4, the part of the stopper portion 460 will be described, and the descriptions and drawings of the other constituent elements will be omitted.

In the stopper portion 460, a first stopper portion 462 which extends in the first direction (positive X axis direction) from the fixed portion 31, and a second stopper portion 463 which extends in the second direction which intersects with the first stopper portion 462 and is provided with a gap d3 interposed between the second stopper portion and the movable weight 33, are provided. In addition, in the stopper portion 460, a recess 465 which has an opening facing the fixed portion 31 on one end of the movable weight 33 is provided. The first stopper portion 462 is loosely inserted into the recess 465 with the gap d3 interposed between the first stopper portion and the movable weight 33, or with a gap d402 interposed between the first stopper portion and a protrusion 472 which is provided on the movable weight 33.

On the recess 465, the protrusion 472 as a third protrusion is provided in the first direction (negative X axis direction) and so as to face the second stopper portion 463. The gap d402 between the protrusion 472 and second stopper portion 463 is provided to be narrower than the gap d1 between the movable electrode portions 36 and 37 and the fixed electrode portions 38 and 39 omitted in the drawing.

Accordingly, in a case where the movable weight 33 is displaced in the Y axis direction, since the recess 465 and a tip end 463a of the second stopper portion 463 which is loosely inserted into the recess 465 come in contact with each other, it is possible to make the contacting area of the stopper portion 460 and the recess 465 small.

In addition, in a case where the movable weight 33 is displaced in the X axis direction, since the second stopper portion 463 and the protrusion 472 come in contact with each other, it is possible to make the contacting area of the stopper portion 460 and the recess 465 small. Accordingly, it is possible to suppress the damage on the movable weight 33 and the stopper portion 460 from the impact of the contact.

One protrusion 472 is provided on the recess 465 in the modification example 4, however it is not limited thereto, and the plurality of protrusions 472 may be provided. The position of the protrusion 472 is not particularly limited as long as the protrusion 472 protrudes towards the second stopper portion 463.

The other configurations of the stopper portion 460 are the same as those of the physical quantity sensors 1a and 1b described in the embodiments, and thus the descriptions thereof are omitted.

In each modification example, the example in which the stopper portion is provided on the fixed portion 31 side which is one end of the movable weight 33 on the negative X axis direction side, is shown, however, it is not limited thereto. Each of the stopper portions (160, 260, 360, and 460) may be provided on the fixed portion 32 side which is one end of the movable weight 33 on the positive X axis direction side. In addition, in the same manner as the physical quantity sensor 1*b* described in Second Embodiment, each of the stopper portions(160, 260, 360, and 460) may be provided on both end sides of the movable weight 33 in the X axis direction.

The stopper portion may be configured in combination of the modification example 1, and the modification examples 2 to 4.

For example, in the stopper portion 160 shown in the modification example 1, the second stopper portion 263 may be provided on the tip end 262*a* of the first stopper portion 262 shown in the modification example 2.

For example, the protrusion 371 may be provided on the second stopper portion 363 shown in the modification example 3. In addition, the protrusion 371 may be provided so as to face the protrusion 170, on the second stopper portion 363. Accordingly, it is possible to regulate the displacement of the movable weight 33 in both directions of the positive X axis direction and the negative X axis direction.

For example, the protrusion 472 may be provided on the recess 465 as shown in the modification example 4.

In addition, in the embodiments and the modification examples, the tip end of each stopper portion and each protrusion may have a circular arc shape or a conical shape. Since the tip end of each stopper portion and each protrusion has a circular arc shape or a conical shape, it is possible to make the contacting area with the movable weight 33 small, and it is possible to alleviate the impact when contacting with the movable weight 33 and to suppress the damage thereon.

In the embodiments and the modification examples, the first stopper portion 62 which extends from the fixed portion 31 or the fixed portion 32 may be provided to have a narrower width near the tip end 62*a* compared to the fixed portions 31 and 32. Since the first stopper portion 62 has the narrower width near the tip end 62*a*, it is possible to make the contacting area with the movable weight 33 small, and it is possible to alleviate the impact from contact with the movable weight 33 and to suppress the damage thereon. Since the first stopper portion 62 has a greater width on a part of a base portion which extends from the fixed portions 31 and 32, compared to the tip end 62*a*, it is possible to increase strength of the first stopper portion 62. Accordingly, the first stopper portion 62 can suppress the damage when contacting with the movable weight 33.

In addition, the second stopper portion 63 which extends from the first stopper portion 62 may also be provided to have a narrower width near the tip end 63*a*. Since the second stopper portion 63 has the narrower width near the tip end 63*a*, it is possible to make the contacting area with the movable weight 33 small, and it is possible to alleviate the impact when contacting with the movable weight 33 and to suppress the damage thereon. Since the second stopper portion 63 has a greater width on the portion of a base portion which extends from the fixed portions 31 and 32, compared to the tip end 63*a*, it is possible to increase strength of the second stopper portion 63. Accordingly, the second stopper portion 63 can suppress the damage from contacting the movable weight 33.

EXAMPLES

Next, examples in which any of the physical quantity sensors 1*a* to 1*f* (hereinafter, collectively referred to as the physical quantity sensor 1) according to the embodiment and the modification examples of the invention is applied, will be described with reference to FIGS. 7 to 10.

Electronic Device

First, an electronic device to which the physical quantity sensor 1 according to one embodiment of the invention is applied will be described with reference to FIGS. 7 to 9.

Figure 7:
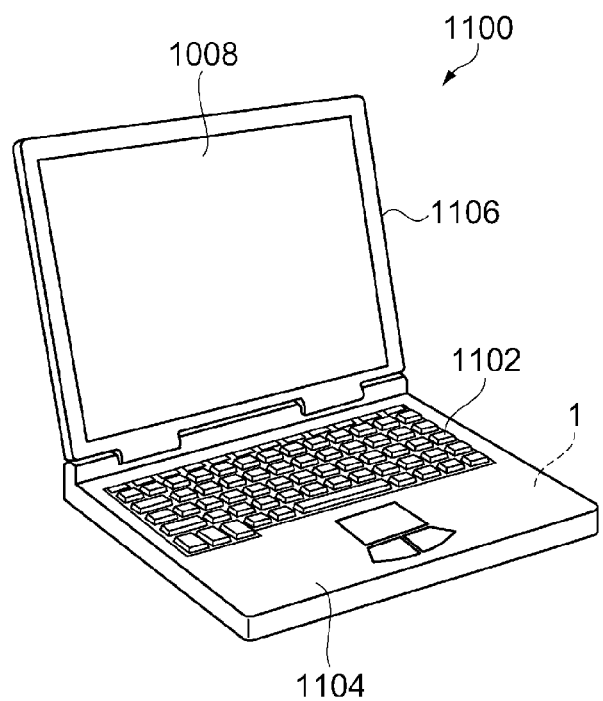
FIG. 7 is a view schematically showing a personal computer as an electronic device according to an example.

FIG. 7 is a perspective view schematically showing a configuration of a note-type (or mobile type) personal computer as an electronic device including the physical quantity sensor according to one embodiment of the invention. In the drawing, a note-type personal computer 1100 is configured with a main body portion 1104 including a keyboard 1102, and a display unit 1106 including a display portion 1008, and the display unit 1106 is supported to be rotatable with respect to the main body portion 1104 through a hinge structure portion. The physical quantity sensor 1 which functions as an acceleration sensor or the like for sensing acceleration or the like applied to the note-type personal computer 1100 and displaying the acceleration or the like on the display unit 1106 is embedded in the note-type personal computer 1100.

Figure 8:
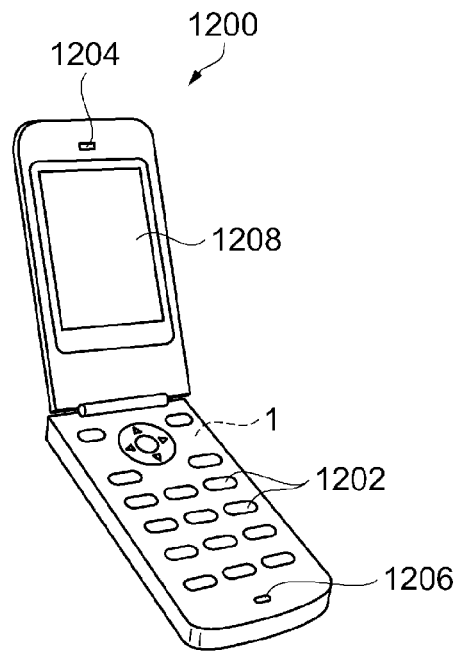
FIG. 8 is a view schematically showing a mobile phone as an electronic device according to an example.

FIG. 8 is a perspective view schematically showing a configuration of a mobile phone (including PHS) as an electronic device including the physical quantity sensor according to one embodiment of the invention. In the drawing, a mobile phone 1200 includes a plurality of manipulation buttons 1202, an earpiece 1204, and a mouthpiece 1206, and a display portion 1208 is disposed between the manipulation buttons 1202 and the earpiece 1204. The physical quantity sensor 1 which functions as an acceleration sensor or the like for sensing acceleration or the like applied to the mobile phone 1200 and assisting the manipulation of the mobile phone 1200 is embedded in the mobile phone 1200.

Figure 9:
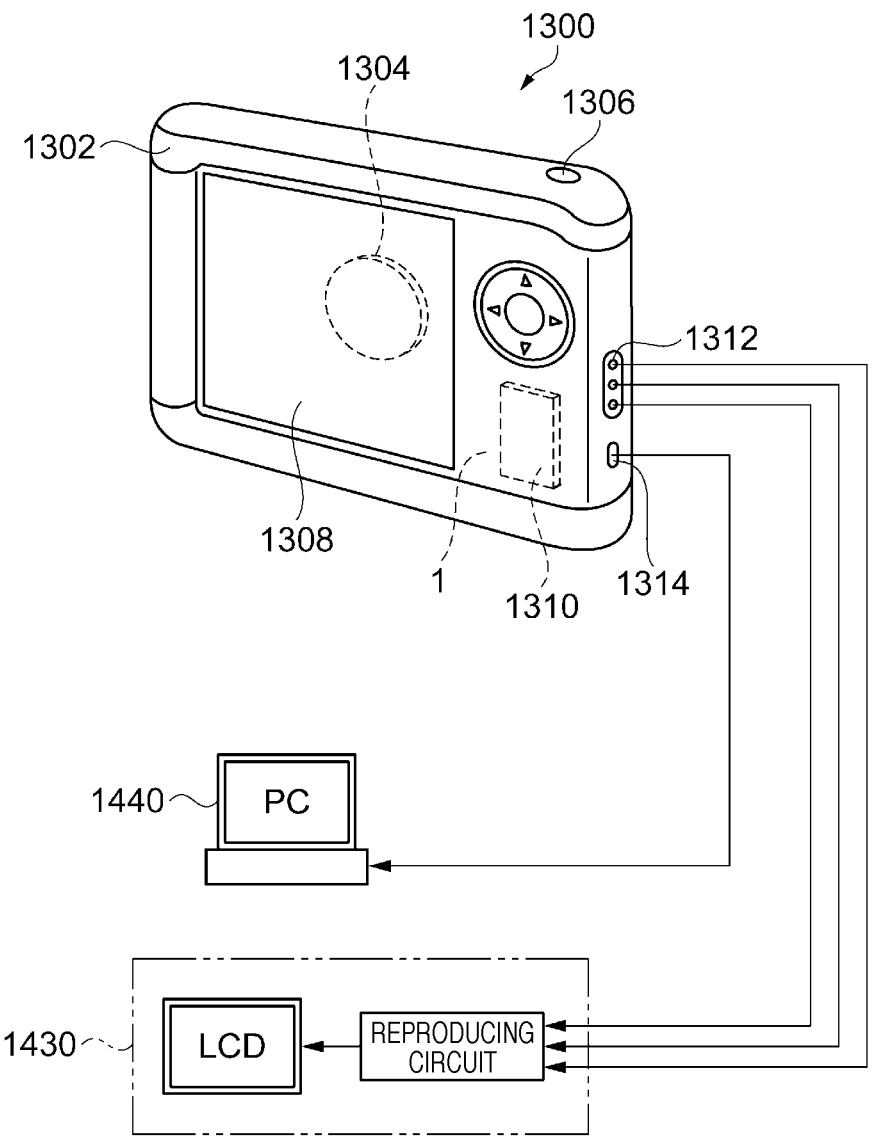
FIG. 9 is a view schematically showing a digital still camera as an electronic device according to an example.

FIG. 9 is a perspective view schematically showing a configuration of a digital still camera as an electronic device including the physical quantity sensor 1 according to one embodiment of the invention. The connection with an external device is simply shown in the drawing. While a film of silver halide photography is exposed to light by an optical image of a subject in atypical camera, an imaging signal (image signal) is generated by performing photoelectric conversion of an optical image of a subject with an imaging device such as a charge coupled device (CCD) or the like, in a digital still camera 1300.

A display portion 1308 is provided on a rear surface of a case (body) 1302 of the digital still camera 1300 and has a configuration of performing display based on the imaging signal by the CCD, and the display portion 1308 functions as a finder for displaying a subject as an electronic image. In addition, alight receiving unit 1304 including an optical lens (imaging optical system) or the CCD is provided on a front surface side (rear surface side in the drawing) of the case 1302.

When an photographer recognizes a subject image displayed on the display portion 1308 and presses a shutter button 1306, an imaging signal of the CCD at that time point is transferred to and stored in a memory 1310. In addition, in the digital still camera 1300, a video signal output terminal 1312 and an input and output terminal 1314 for data communication are provided on a side surface of the case 1302. As shown in the drawing, a liquid crystal display 1430 is connected to the video signal output terminal 1312, and a personal computer 1440 is connected to the input and output terminal 1314 for data communication, as necessary. In addition, it is configured that the imaging signal stored in the memory 1310 is output to the liquid crystal display 1430 or the personal computer 1440 with predetermined manipulation. In order to operate a function of protecting the digital still camera 1300 from the dropping, the physical quantity sensor which functions as an acceleration sensor for sensing acceleration due to the dropping is embedded in the digital still camera 1300.

In addition to the personal computer (mobile-type personal computer) of FIG. 7, the mobile phone of FIG. 8, and the digital still camera of FIG. 9, the physical quantity sensor 1 according to one embodiment of the invention can be applied to electronic devices such as an ink jet-type discharging device (for example, ink jet printer), a television, a video camera, a video tape recorder, a car navigation device, a pager, an electronic notebook (including communication function), an electronic dictionary, a calculator, an electronic game machine, a word processor, a workstation, a video telephone, a security television monitor, an electronic binocular, a POS terminal, a medical apparatus (for example, an electronic thermometer, a blood pressure meter, a blood glucose meter, an ECG measuring device, a ultrasound diagnostic device, an electronic endoscope), a fishfinder, a variety of measurement apparatuses, a meter (for example, meters for vehicles, aircraft, ships), a flight simulator, and the like.

Moving Object

Figure 10:
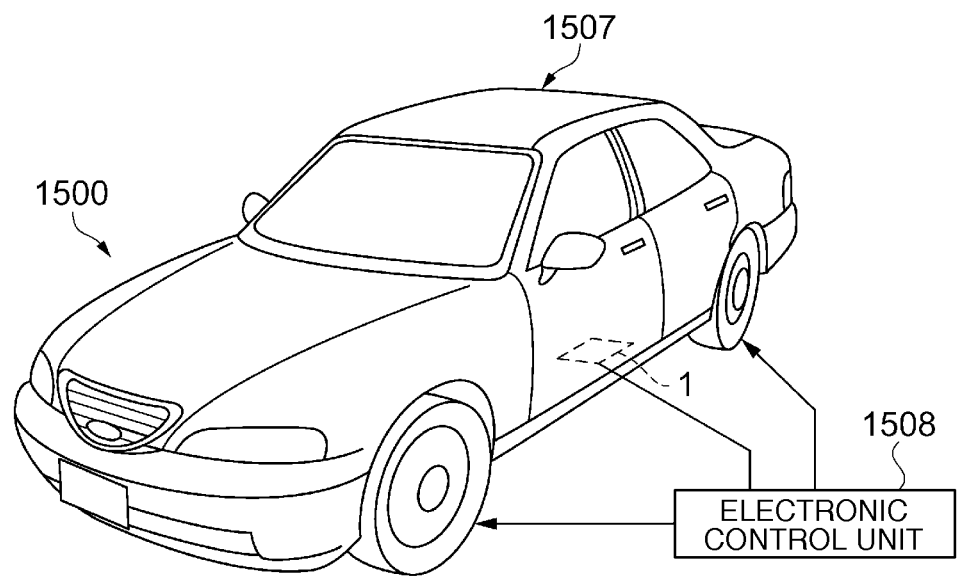
FIG. 10 is a view schematically showing a vehicle as a moving object according to an example.

FIG. 10 is a perspective view schematically showing a vehicle as an example of a moving object. A vehicle 1500 includes the physical quantity sensor 1 according to the invention. For example, as shown in the drawing, in the vehicle 1500 as a moving object, the physical quantity sensor 1 which senses acceleration of the vehicle 1500 is embedded, and an electronic control unit (ECU) 1508 which controls output of an engine is loaded on a car body 1507. In addition thereto, the physical quantity sensor 1 can be widely applied to a vehicle body posture control unit, an anti-lock braking system (ABS), an airbag, and a tire pressure monitoring system (TPMS).

The entire disclosure of Japanese Patent Application No. 2013-003251, filed Jan. 11, 2013 is expressly incorporated by reference herein.

What is claimed is:

1. A physical quantity sensor comprising:
an element piece including a movable weight and movable electrode portions which are provided to extend from the movable weight;
fixed electrode portions which are provided in a first direction in which the element piece is displaced, with a gap d1 interposed therebetween; and
fixed portions which are provided to face an end portion of the element piece,
wherein a recess is provided on an end portion of the movable weight in a position facing the fixed portions, the recess extends from an end of the movable weight into the movable weight along an axis through the center of the movable weight,
a first stopper portion which extends towards the movable weight is provided on the fixed portion, and
a tip end of the first stopper portion is inserted into the recess, and a gap d2 between the tip end and the movable weight is narrower than the gap d1.

2. The physical quantity sensor according to claim 1, wherein the first stopper portion extends towards the first direction.

3. The physical quantity sensor according to claim 2, wherein the movable electrode portions extend in a second direction which intersects with the first direction, and the gap d1 is a gap between the movable electrode portions and the fixed electrode portions.

4. The physical quantity sensor according to claim 2, wherein a first protrusion which is provided to extend in a second direction which intersects with the first direction is included in the recess.

5. The physical quantity sensor according to claim 3, wherein a first protrusion which is provided to extend in the second direction which intersects with the first direction is included in the recess.

6. The physical quantity sensor according to claim 4, wherein a second stopper portion which is provided to extend in the second direction is provided on the first stopper portion.

7. The physical quantity sensor according to claim 5, wherein a second stopper portion which is provided to extend in the second direction is provided on the first stopper portion.

8. The physical quantity sensor according to claim 6, wherein a second protrusion which is provided to extend in the first direction is provided on the second stopper portion.

9. The physical quantity sensor according to claim 7, wherein a second protrusion which is provided to extend in the first direction is provided on the second stopper portion.

10. The physical quantity sensor according to claim 8, wherein a third protrusion is provided on the movable weight in a position facing the second stopper portion.

11. The physical quantity sensor according to claim 9, wherein a third protrusion is provided on the movable weight in a position facing the second stopper portion.

12. An electronic device on which the physical quantity sensor according to claim 1 is loaded.

13. A moving object on which the physical quantity sensor according to claim 1 is loaded.

* * * * *